United States Patent [19]

Tennerstedt

[11] Patent Number: 4,604,009
[45] Date of Patent: Aug. 5, 1986

[54] TOOL RETENTION MECHANISM

[75] Inventor: M. Richard Tennerstedt, Wilmette, Ill.

[73] Assignee: Illinois Tool Works Inc., Chicago, Ill.

[21] Appl. No.: 754,098

[22] Filed: Jul. 12, 1985

[51] Int. Cl.$^4$ .............................................. B23C 5/26
[52] U.S. Cl. ...................................... 409/233; 279/37; 279/57; 408/239 R
[58] Field of Search ............... 409/231, 232, 233, 234; 408/239 R, 239 A; 279/37, 43, 50, 57, 65, 74, 82; 29/548

[56] References Cited

U.S. PATENT DOCUMENTS

| | | | |
|---|---|---|---|
| 3,168,322 | 2/1965 | Dziedzic | 279/50 X |
| 3,372,951 | 3/1968 | McCash | 409/233 X |
| 3,490,333 | 1/1970 | Scruton | 409/233 |
| 3,548,480 | 12/1970 | Daniels | 29/568 X |
| 4,011,791 | 3/1977 | Lanzenberger | 409/233 |
| 4,063,488 | 12/1977 | Kagerer | 409/233 |
| 4,135,848 | 1/1979 | Hughes et al. | 409/233 X |
| 4,303,360 | 12/1981 | Cayen et al. | 409/233 |
| 4,411,568 | 10/1983 | Rohm | 409/233 |
| 4,560,310 | 12/1985 | Eckstein et al. | 409/233 |

*Primary Examiner*—Gil Weidenfeld
*Assistant Examiner*—Glenn L. Webb
*Attorney, Agent, or Firm*—J. P. O'Brien; T. W. Buckman

[57] ABSTRACT

A tool retention mechanism is disclosed for clamping a tool holder knob. An elongate rod member is supported lengthwise in a compartment formed within the center of an elongate housing. A knob clamping assembly is mounted on the outer end of the rod member and is constructed of a circular array of claw fingers that are spring biased to urge them to move radially inward. A first piston is slideably supported on the actuator rod rearwardly of the claw fingers and has a cylindrical collar portion which slides over the claw fingers to retain them in a knob clamping position. A second piston is secured to the inner end portion of the actuator rod and slideably supported in the compartment to define a closed chamber with the inner closed end of the compartment. A first set of belleville spring washers is mounted on the actuator rod between the first and second pistons to bias the first piston to the knob holding position, and a second set of belleville washers is coaxially disposed relative to the first set of belleville washers between an annular shoulder formed in the compartment and the second piston to effect a large force on the actuator rod in a direction towards the closed end of the compartment. A fluid control means is provided for selectively driving the second piston a slight distance to overcome the force exerted by the outer set of belleville washers and to simultaneously drive the first piston inwardly of the compartment and move the cylindrical collar portion inwardly of the claw fingers to free them to open.

10 Claims, 3 Drawing Figures

TOOL RETENTION MECHANISM

BACKGROUND AND SUMMARY OF THE INVENTION

This invention relates to a tool retention mechanism for retaining a tool holder and its associated tool in a drive spindle against axial movement.

There are a number of tool retention mechanisms available in the prior art for rigidly holding the knob of a tool holder against axial movement within a drive spindle. For safety purposes, these tool retention mechanisms employ a long array of belleville washers to provide a large holding force for gripping the tool holder knob. This invention was developed out of the need to package the tool retention mechanism in a compact housing which is both shorter and narrower than prior art structures. Because compactness is one of the design requirements, this invention utilizes a unique arrangement and cooperation between two coaxially mounted sets of belleville washers.

A tool retention mechanism constructed in accordance with the principles of this invention is assembled in a housing having an elongate internal compartment with an opening at one end. A elongate rod member is supported lengthwise in the compartment and supports at one end a knob clamping assembly which is formed by a circular array of claw fingers that are spring biased to close together. A first piston is slideably disposed on the rod behind the claw fingers and has a cylindrical collar portion which is adapted to engage the claw fingers as it is moved outwardly to and hold them in a knob clamping position. A second piston is secured to the inner end of the rod member. A first spring biased means is provided for exerting a constant force along the rod member in a direction inwardly of the compartment and a second spring biased means exerts a constant force on the cylindrical collar portion in an outward direction of the compartment. A fluid control means is provided for selectively and sequentially driving the second piston means to overcome the force exerted by the first spring bias means and driving the first piston means from the extend position to the retract position.

DESCRIPTION OF DRAWINGS

For a better understanding of this invention, reference may be made to the accompanying drawings, in which.

DESCRIPTION OF PREFERRED EMBODIMENT

Figure 1:
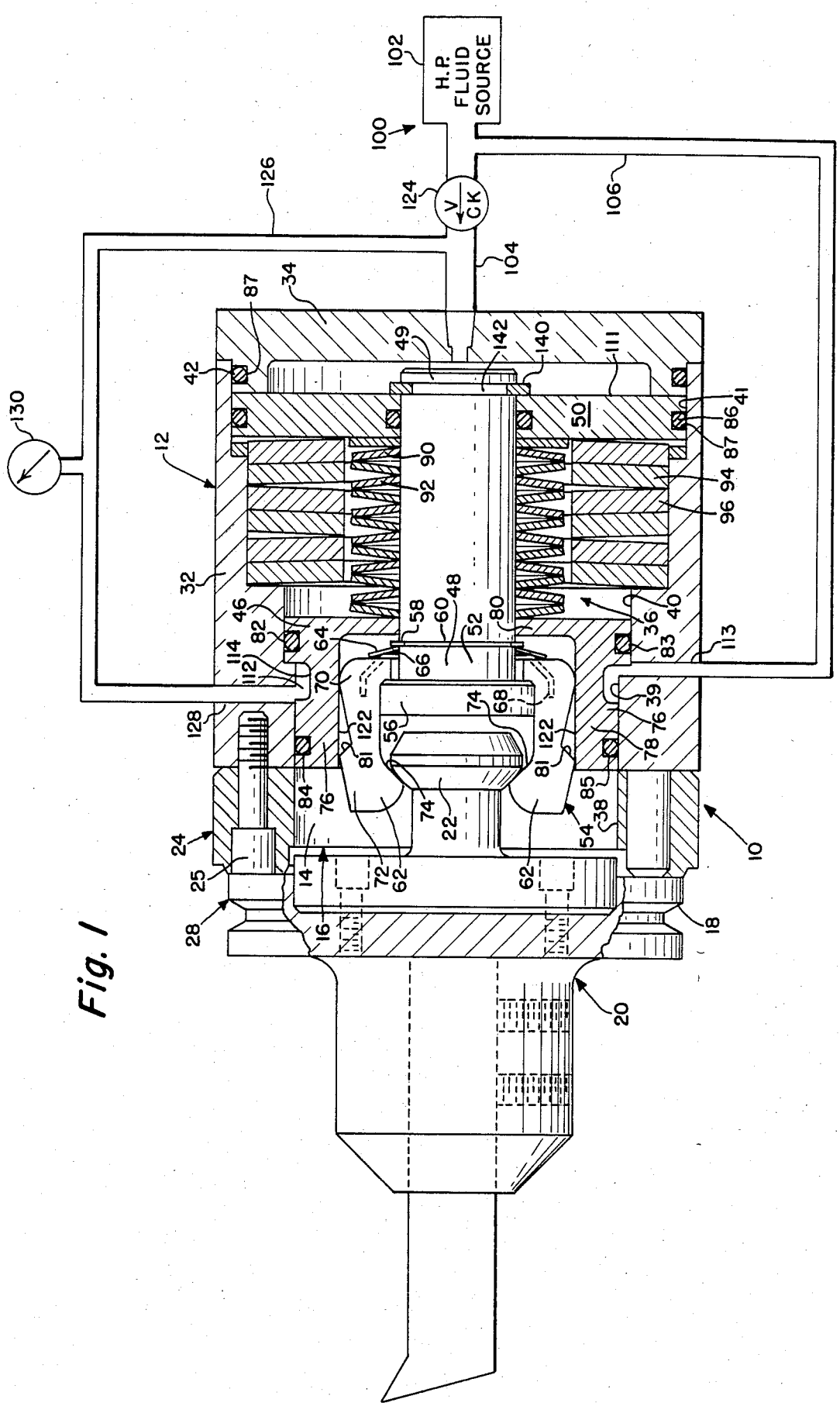
FIG. 1 is a cross sectional view of the preferred embodiment of this invention taken along the axial center line of the tool retention mechanism's housing with the arrangement of parts shown in the knob clamping position.
Figure 2:
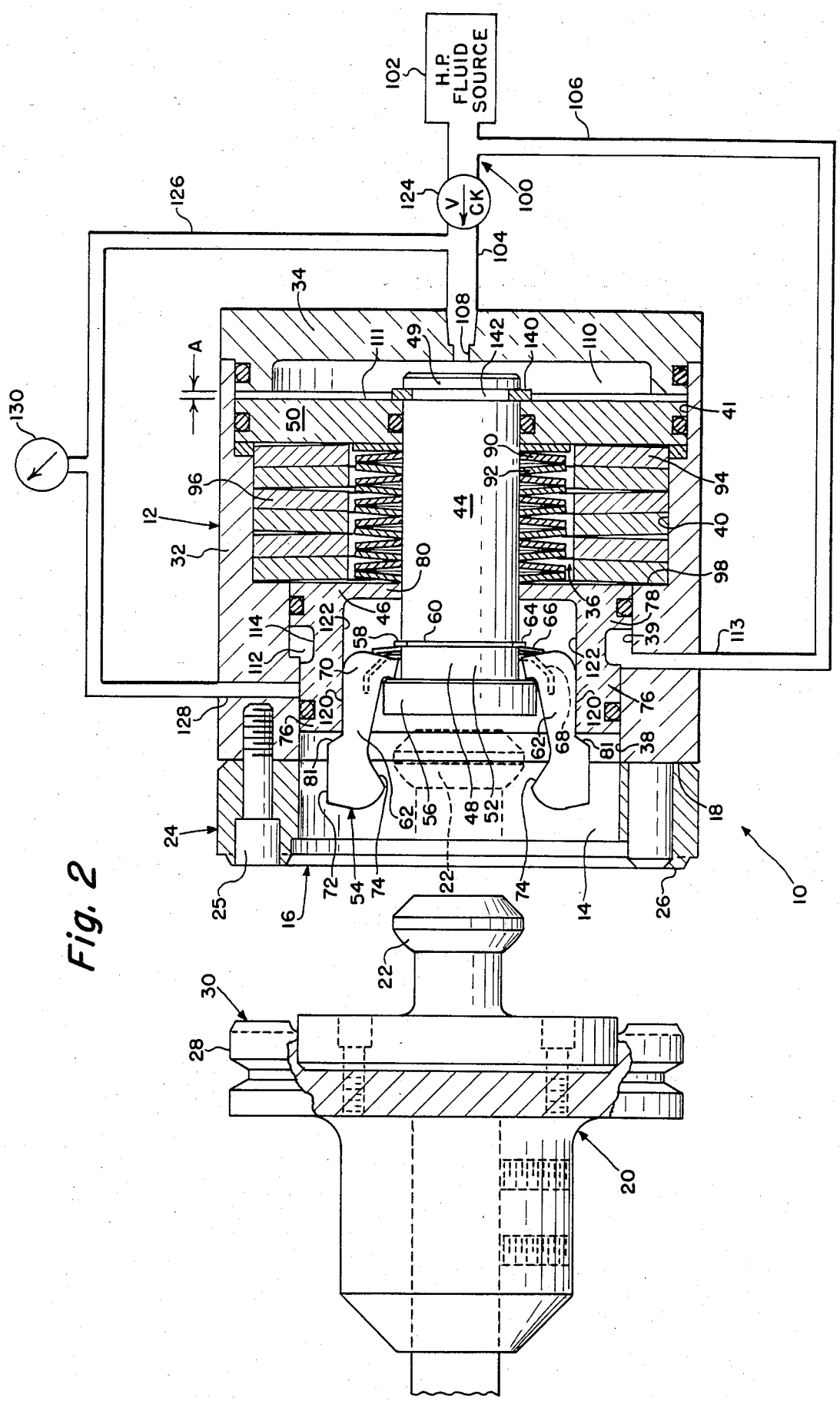
FIG. 2 is identical to the view shown in FIG. 1 with the parts shown in the tool open position.
Figure 3:
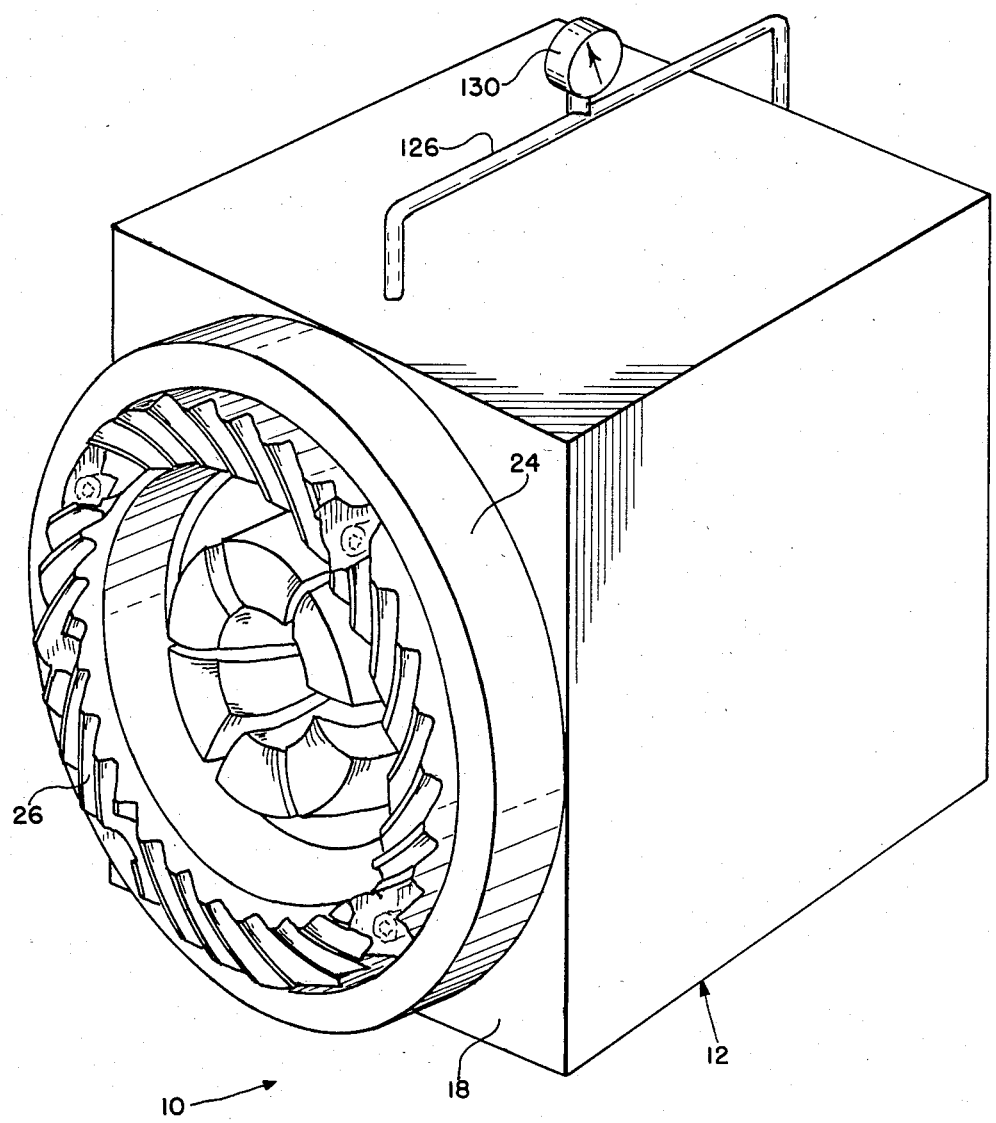
FIG. 3 is a perspective view taken from the left side of FIG. 1 depicting the tool holder removed and with the circular array of claw fingers shown in the knob holding position.

Referring to FIG. 1 and 2 there is depicted a tool retention mechanism embodying the principles of this invention and generally designated by the reference numeral 10. The tool retention mechanism is contained in a box-shaped housing 12.

Housing 12 is formed with an internal cavity or compartment 14 which is enclosed except for an opening 16 extending through end 18 of housing 12.

The tool retention mechanism 10 is designed to rigidly hold a tool holder device 20 by engaging and holding a tool holder knob 22 which projects from the end of the tool holder 20.

A face coupler ring 24 is secured by several bolts 25 to the end 18 of housing 12 about its opening 16. Ring 24 is formed with a plurality of radially extending teeth 26 on its end face. An identical face coupler ring 28 is formed on the end face of tool holder 20. Coupler ring 28 has radially extending teeth 30 which are the mirror image of teeth 26 on face coupler ring 28.

When the tool holder 20 is brought into engagement with the housing 12, the mating teeth 26 and 30 intermesh to provide automatic self-centering of the tool holder 20 relative to the housing 12 and a positive driving engagement therebetween.

The cooperating face coupler rings 24 and 28 form no part of this invention and could be provided by a number of prior art face-type couplers, such as disclosed in U.S. Pat. No. 4,307,797, which is commonly owned along with this application by Illinois Tool Works Inc.

Housing 12 has a hollow center body portion 32 which is closed at one end by circular end cap 34. The interior of body portion 32 is formed with a circular throughbore 36 formed with four stepped diameter sections 38, 39, 40 and 41. The end cap 34 is fastened to the inner end of body portion 32 in a fluid-tight manner by means of O-ring 42.

An elongate rod member 44 is slidingly supported along the axis of throughbore 36 by means of first piston 46 and second piston 50. First piston 46 is slidingly carried adjacent the outer end 48 of rod member 44 and second piston 50 is secured to the inner end 49 of rod member 44.

Knob clamping assembly 54 is mounted on outer end 48 of rod member 44 between its circular head 56 and C-shaped locking ring 58. The C-shaped locking ring 58 is inserted into a circular groove 60 formed adjacent the outer end 48 of rod member 44. The knob clamping assembly 54 is constructed of a circular array of claw fingers 66 which are pivotally suggested on rod member 44 by means of spring retaining device 64.

Spring retaining device 64 is made by forming a plurality of spacer fingers 68 on belleville washer base 66. Each claw fingers 62 is pivotally mounted between two of spacer fingers 68 in a manner to cause the finger's base portion 70 to be biased by a light spring force toward the knob clamping position (FIG. 1).

Claw fingers 62 extend forwardly of rod members 44 allowing their outer ends 72 to reach beyond housing opening 16. Outer end 72 of each claw finger 62 has an angled interface 74 conforming to the shape of the tool holder knob 22. As will be explained in further detail hereinafter, claw fingers 62 cooperate to retain the tool holder knob 22 when actuated into the knob clamping position of FIG. 1.

First piston 46 has an integrally formed claw finger actuating member 76 in the form of a cylindrical collar portion 78 extending in an axial direction forwardly of the circular plate 80 of first piston 46. First piston 46 can be moved between the retract position (FIG. 2) and the extend position (FIG. 1). As piston 46 is driven from the retract position to the extend position, the forward edge of cylindrical collar 78 moves in a path to engage ramp surface 80 on each claw finger 62 to cam the claw fingers radially inwardly to the knob clamping position of FIG. 1, in the event the claw fingers are being held in the open position.

First piston 46 is maintained in a fluid-tight sealed relationship as it slides within the circular bore 36 by virtue of a pair of O-rings 82 and 84 installed in annular grooves 83 and 85 adjacent to the two ends of cylindrical collar portion 78. Likewise second piston 50 is maintained in a fluid-tight sealed relationship by virtue of O-ring 86 provided in an outer peripheral annular groove 87.

First spring bias means 90 is disposed between first piston 46 and second piston 50 for providing a force on first piston 46 to move it towards the extend position (FIG. 1). First spring bias means 90 is constructed of a short stack belleville washers 92 slidingly supported on rod member 44 between first and second pistons 46 and 50, respectively.

Second spring bias means 94 provides a spring force on rod member 44 to exert a larger pulling force on knob clamping assembly 54 in a direction towards the closed end of compartment 14 to retain the claw fingers 62 in the knob clamping position (FIG. 1). Second spring bias means 94 is constructed by a second set of belleville washers 96, which are arranged concentrically with the first set of belleville washer 92 and are disposed between second piston 50 and annular shoulder 98 in the stepped diameter portion 40 of circular throughbore 36. Since piston 50 is anchored to the inner end 44 of rod member 44, it transmits the large spring force of belleville washers 96 directly to the rod member 44 in an axial direction towards end cap 34. The resultant spring retention force is the sum of the spring force of belleville washers 92 and 96.

Selective displacement of first and second pistons 46 and 50, respectively, against the force of the first and second set of belleville washer 92 and 96, respectively, is accomplished by fluid control means 100. Fluid control means 100 uses a high pressured fluid source designated by the block 102, which selectively introduces a fluid, such as oil, under high pressure into the main fluid conduit 104 and first by-pass conduit 106.

Main conduit 104 terminates at port 108 formed through the center of end cap 34 to introduce the pressurized fluid into the expandable chamber 110, which is defined by the interior cavity of end cap 34 and the rear face 111 of piston 50. This introduction of fluid under pressure into chamber 110 causes the displacement of second piston 50 a short distance "A" (see FIG. 2) by overcoming the spring force of second belleville washers 96. This displacement of second piston 50 removes the tension force from knob 22.

Simultaneously, the pressure under fluid through by-pass conduit 106 enters into annular chamber 112, which is defined by the inner wall of stepped diameter portion 39 and annular groove 114 formed about the middle peripheral section of cylindrical collar 78. The by-pass conduit 106 is connected directly to second port 113 formed through the housing 112 in communication with the chamber 112 to introduce the fluid under pressure in the right hand portion (as viewed in FIG. 1) of the annular groove 114 to cause the first piston 46 to be displaced to the right until it reaches the retract position of FIG. 2.

A key element in the design is to size the effective area of piston 46 in concert with the forces from bellevilles 92 such that essentially all the knob retention forces have been removed prior to movement of piston 46. The piston 50 moves enough to take off the retention load before 46 starts to move.

The reason for using a pair of concentrically arranged belleville washer sets 92 and 96 is to permit housing 12 to be as dimensionally compact as possible. In prior art structures, there was no practical limitation on the length of the housing containing the belleville washers. Prior art retention mechanisms employ a long stack of belleville washers in order to get the desired high loads and long strokes without exceeding the stress levels.

This invention overcomes the prior art limitations of using a long stack of belleville washers by employing two sets of belleville washers that function independently of each other to provide two distinct but cooperating functions. The second set of belleville washers 96 provide a very high spring force for retaining the knob clamping assembly 54 in the knob clamping position of FIG. 1. This set of washers would provide a retention force of the order of 8,000 pounds.

It is noted that the displacement of second piston 50, as represented by the dimension "A" of FIG. 2, is a very small distance relative to the displacement of first piston 46. This displacement would be of the order of 0.045 inches. When this displacement occurs, the 8,000 pounds force exerted by the second set of belleville washers is overcome to thereby remove the drag force between the outer surface 120 of each claw member 62 and the inner surface 122 of the cylindrical collar 78.

The first set of belleville washers 96 functions to provide a constant spring biased force on first piston 46 in a direction to displace it to the extend position of FIG. 1 and thereby hold the claw fingers 62 in the knob clamping position. As compared to the displacement of second piston 50, the first set of belleville washers 90 are designed to displace the first piston 46 a relatively large distance with a much smaller spring force. For example, the first set of bellevilles 90 need have only a 500 pound force with first piston 46 in its clamp on position. The travel extent of first piston 46 would be 0.200 inches of travel and exert a 1,000 pound load.

When fluid control means 100 is actuated to drive the first and second pistons 46 and 50 against the spring force of the respective belleville washer sets, spring retaining device 64 exerts a light spring bias force on the tool holder knob 22. A slight pull out force on the tool holder 20 will cause the fingers to spread to the position of FIG. 2, releasing the tool holder from the housing 12 as depicted in FIG. 2.

To return the tool retention mechanism 10 to the knob clamping position, fluid control means 100 can be selectively activated to relieve the fluid pressure on first and second pistons 46 and 50 and thereby permit the first and second set of belleville washers to return the moveable parts to the position represented in FIG. 1.

To accomplish the release of the pressure on first piston 46, high pressure fluid source 102 is disconnected and fluid is allowed to drain from by-pass line 106. This action causes the first piston 46 to be driven under the spring force of first set of belleville washers 90 to the left to the extend position of FIG. 1.

Check valve 124 prevents the release of the high pressured fluid from the chamber 110 when the high pressured fluid is released from by-pass line 106. However, as the piston 46 moves to the extend position (FIG. 1), fluid under pressure from chamber 110 will be released via main conduit 104, second by-pass conduit 126 and third port 128 as first piston 46 moves a sufficient amount to the left to place third port 128 into communication with chamber 112. This action will permit the second set of belleville washers 96 to displace the second piston 50 the slight distance "A" and bring the tool retention mechanism 10 to the position of FIG. 1.

In the event that the tool holder 20 is not fully inserted into the knob clamping assembly 10, the second by-pass conduit 126 includes a fluid pressure indicator 130 to warn that there is fluid pressure in line 126. This warning advises the operator that the first piston 46 has not moved to the position necessary to allow complete coupling of the retention knob 22. Pressure indicator 130 could be any of a number of known commercial units which provide either a visual and/or audible signal.

One of the important features of this invention is the simple and convenient manner of constructing the tool retention mechanism 10. The spring retaining device 64 with its set of claw fingers 62 is slid from the inner end 49 of rod member 44 until it reaches the outer end 48. A C-shaped retention member 58 is then snapped into the groove 60 to hold the knob clamping assembly 54 in place. First piston 46 is then slid onto inner end 49 of rod 44. Next the first set of belleville washers 92 is slid onto rod 44 and second set 96 is placed into a concentric relation with the first set. Second piston 50 is then slid onto rod 44 and a C-shaped retention member 140 is snapped into slot 142 on the inner end of rod 44.

The entire assembly is then inserted into the larger diameter end of body portion 32 and end cap 34 is secured to the larger diameter end of the housing 12 to complete the assembly.

By virtue of the compact arrangement of the tool retention mechanism 10, it is possible to retrofit the mechanism to most machine tools, requiring little or no turret modification. The resulting tool retention mechanism is totally adaptable to any numeric control, automatic, robotic or tool changing systems.

I claim:

1. A tool retention mechanism for clamping a tool holder knob, comprising a housing having an internal compartment communicating with an opening through said housing, a rod member supported lengthwise in said compartment and having its outer end disposed ajacent said housing opening, knob clamping assembly including a circular array of claw fingers pivotally mounted on said outer end of said rod member and moveable between an open position and a knob clamping position, first piston means slidably disposed in said compartment for movement between a retract position and an extend position, said first piston means including finger engaging means for retaining claw fingers at said knob clamping position when said first piston means moves to said extend position, second piston means for moving said rod member lengthwise of said compartment between a load and unload positions, first spring bias means for exerting a force on said rod member away from said housing opening, second spring bias means for exerting a force on said finger engaging means towards said housing opening, and fluid control means for selectively driving said second piston means from said load position to said unload position to overcome the force exerted by said first spring bias means and for driving said first piston means from said extend position to said retract position to overcome the force exerted by said second spring bias means, and for selectively releasing the driving force on said second piston means to permit said first bias means to return to said retract position and for releasing the driving force on said first piston means to permit said second spring bias means to return said knob clamping assembly to said knob clamping position.

2. A tool retention mechanism as defined in claim 1, further comprising means for indicating the unsafe condition of said claw fingers not being in said knob clamping position upon said fluid control means being activated to drive said second piston means from said load position to said unload position.

3. A tool retention mechanism for clamping a tool holder knob, comprising a housing having an internal compartment in communication with an opening through said housing, a rod member supported lengthwise in said compartment and having its outer end disposed adjacent said opening, knob clamping assembly mounted on said outer end of said rod member, said knob clamping assembly including a circular array of claw fingers mounted on said outer end of said rod member and including spring bias means for urging said claw fingers to radially close together from an open position to a knob clamping position, first piston slidably supported in said compartment between a retract position and an extend position and slidably mounted on said actuator rod rearwardly of said claw fingers, said first piston including a cylindrical collar portion extending towards said outer end and having an internal diameter of the same size as the outer peripheral margin of said circular array of claw fingers when in said knob clamping position, second piston slidably supported in said compartment between a load and unload positions and secured on the inner end portion of said actuator rod between said first and second pistons, second set of belleville washers disposed coaxially of said first set and supported between an annular shoulder formed in said compartment and said second piston, and fluid control means for selectively driving said second piston from said load to said unload positions to overcome the force exerted by said first set of belleville washers and driving said first piston from said extend position to said retract position to cause said cylindrical collar portion to move away from engagement with said claw fingers to overcome the force exerted by said second spring bias means, and for selectively releasing the driving force on said second piston means to permit said first bias means to return to said retract position and for releasing the driving force on said first piston means to permit said second spring bias means to return said knob clamping assembly to said knob clamping position.

4. A tool retention mechanism as defined in claim 3, wherein said fluid control means includes a first port formed through said housing in communication with a closed chamber defined by the inner closed end of said compartment and said second piston.

5. A tool retention mechanism as defined in claim 4, wherein said fluid control means includes an annular recess formed circumferentially in the outer surfaces of said cylindrical collar portion and a second port formed through said housing in communication with said annular recess for all positions of said first piston.

6. A tool retention mechanism as defined in claim 5, wherein said fluid control means includes a first port formed through said housing in communication with a closed chamber defined by the inner closed end of said compartment and said second piston, an annular recess formed circumferentially in the outer surface of said cylindrical collar portion, a second port formed through said housing in communication with said annular recess for all positions of said first piston, a third port formed through said housing in communication with said annular recess upon said first piston moving to said extend position, a first fluid line connected to said first port, a second fluid line interconnecting said third port and said first fluid line, a third fluid line interconnecting said second port and said first fluid line, and high pressure fluid source means for selectively introducing a fluid under pressure to said first, second and third fluid lines.

7. A tool retention mechanism as defined in claim 6, wherein said fluid control means further comprises a check valve means connected in said first fluid line between said second and third fluid lines for preventing the release of a fluid under pressure introduced from said high pressure fluid source means from said first and third fluid lines.

8. A tool retention mechanism as defined in claim 7, further comprising a fluid pressure indicating means connected in said third fluid lines for signaling the release of fluid pressure in said third fluid line through said annular recess and outwardly through said first fluid line upon said first piston being displaced to said extend position.

9. A tool retention mechanism as defined in claim 1, wherein said tool holder knob has a spherical surface formed on the portion which is engageable by said claw fingers.

10. A tool retention mechanism as defined in claim 3, wherein said tool holder knob has a spherical surface formed on the portion which is engageable by said claw fingers.

* * * * *